(12) United States Patent
van der Laan et al.

(10) Patent No.: US 6,554,435 B2
(45) Date of Patent: Apr. 29, 2003

(54) IMAGE DISPLAY DEVICE AND ADJUSTING MECHANISM

(75) Inventors: Richard van der Laan, Eindhoven (NL); Hans Alphonsius Maria Steijaert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/826,565

(22) Filed: Apr. 5, 2001

(65) Prior Publication Data

US 2001/0040672 A1 Nov. 15, 2001

(30) Foreign Application Priority Data

May 11, 2000 (EP) .............................. 00201686

(51) Int. Cl.[7] .............................................. G03B 21/00
(52) U.S. Cl. ...................................... 353/122; 353/119
(58) Field of Search ................. 353/119, 122, 353/31

(56) References Cited

U.S. PATENT DOCUMENTS

| 5,092,671 A | * | 3/1992 | Van Os ........................ 353/119 |
| 5,237,399 A | * | 8/1993 | Inada et al. .................. 348/761 |
| 6,322,217 B1 | * | 11/2001 | Fujimori et al. ............ 353/119 |

* cited by examiner

Primary Examiner—David M. Gray
Assistant Examiner—Michelle Nguyen (57) ABSTRACT

An image display device comprising at least one adjusting mechanism for adjusting a light modulation panel with respect to a prism, wherein the adjusting mechanism includes two plates extending transversely to the light modulation panel. The first plate has at least two points of fixation which can each be moved in the plane of the plate by means of a parallelogram mechanism. The second plate has at least one point of fixation which can be moved in the plane of the second plate by means of a parallelogram mechanism. Connected to the points of fixation is a bearing plate which can be moved in a direction transversely to the bearing plate by means of said three parallelogram mechanisms and can be tilted about axes extending in the plane of the bearing plate.

17 Claims, 7 Drawing Sheets

IMAGE DISPLAY DEVICE AND ADJUSTING MECHANISM

TECHNICAL FIELD

The invention relates to an image display device comprising a light source, a separating means for splitting a light beam from the light source into light beams having at least three different colors, at least three light modulation panels, guide means for guiding each light beam towards an associated light modulation panel, combination means for combining the light beams modulated by the light modulation panels, and at least one adjusting mechanism for adjusting at least one light modulation panel with respect to the combination means.

BACKGROUND AND SUMMARY

The invention also relates to an adjusting mechanism.

Such an image display device is, for example, a projection television in which light beams modulated by the light modulation panels are imaged on a projection screen after they have been combined by the combination means such as, for example, a prism. It will be evident that the light beams from the different light modulation panels should be combined in a correct manner so as to obtain a satisfactory image. To this end, the light modulation panels should be accurately adjusted with respect to one another and with respect to the combination means.

In an image display device known from U.S. Pat. No. 5,868,485, a first fixation plate is connected to the prism while a second fixation plate is connected to the light modulation panel. The fixation plates are adjusted with respect to each other by means of wedges to be arranged between the plates. After these wedges have been positioned, they are connected to the fixation plates and a definitive connection between the two fixation plates is obtained.

A drawback of such an adjusting mechanism is that all of the six degrees of freedom of the light modulation panel with respect to the combination means must be determined by means of the wedges. A further drawback of the use of such wedges is that, due to the displacement of a wedge, the light modulation panel is displaced and tilted in different directions and at different angles with respect to the prism. This relatively complicates the adjustment of the light modulation panel with respect to the prism. Moreover, the adjusting mechanism comprises a relatively large number of components so that its assembly is relatively complicated.

It is an object of the invention to provide an image display device in which a light modulation panel can be adjusted with respect to the combination means in a simple manner.

In the image display device according to the invention, this object is achieved in that the adjusting mechanism is provided with two plates extending transversely to the light modulation panel, the first plate having at least two points of fixation, each of which is movable in the plane of the plate by means of a parallelogram mechanism, and the second plate having at least one point of fixation which is movable in the plane of the second plate by means of a parallelogram mechanism, each parallelogram mechanism being provided with an associated locking mechanism, the adjusting mechanism being further provided with a bearing plate connected to the points of fixation and supporting the light modulation panel, which bearing plate is movable by means of the three parallelogram mechanisms in a direction extending transversely to the bearing plate and is tiltable about axes extending in the plane of the bearing plate.

By moving each point of fixation through the same distance by means of the associated parallelogram mechanism, a displacement of the bearing plate in a direction extending transversely to the bearing plate is obtained. If the points of fixation of the first plate are moved in a direction remote from the combination means while the point of fixation of the second plate is moved towards the combination means, a tilt about an axis extending parallel between the plates will take place. By moving the two points of fixation of the first plate in different directions, a tilt of the bearing plate about an axis of the bearing plate extending transversely to the plate will take place. Thus, any desired displacement or tilt of the bearing plate in said three degrees of freedom is possible in a simple manner. By adjusting the bearing plate with respect to the combination means in this manner, the bearing plate can be arranged, for example, in the focal plane of the combination means.

If the line modulation panel only needs to be arranged in one plane, such an adjusting mechanism will be sufficient.

An embodiment of the image display device according to the invention is characterized in that each parallelogram mechanism is formed by four leaf hinges in the plate.

A parallelogram mechanism can be easily provided in a plate by means of leaf hinges.

A further embodiment of the image display device according to the invention is characterized in that the adjusting mechanism is provided with a supporting plate which extends parallel to the bearing plate and to which the light modulation panel is connected, said supporting plate being movable with respect to the bearing plate in directions extending parallel to the bearing plate, and being tiltable about an axis extending transversely to the bearing plate.

After the bearing plate has been arranged in a plane, for example, the focal plane, the light modulation panel can be given any desired orientation in the plane by means of the supporting plate and by adjustment in the other three degrees of freedom.

By using the supporting plate, a clear separation is obtained between arranging the light modulation panel in the plane and subsequently positioning the light modulation panel in a desired orientation in the plane.

These and other aspects of the invention are apparent from and will be elucidated with reference to the embodiments described hereinafter.

DETAILED DESCRITPION

Corresponding components in the Figures have the same reference numerals.

Figure 1:
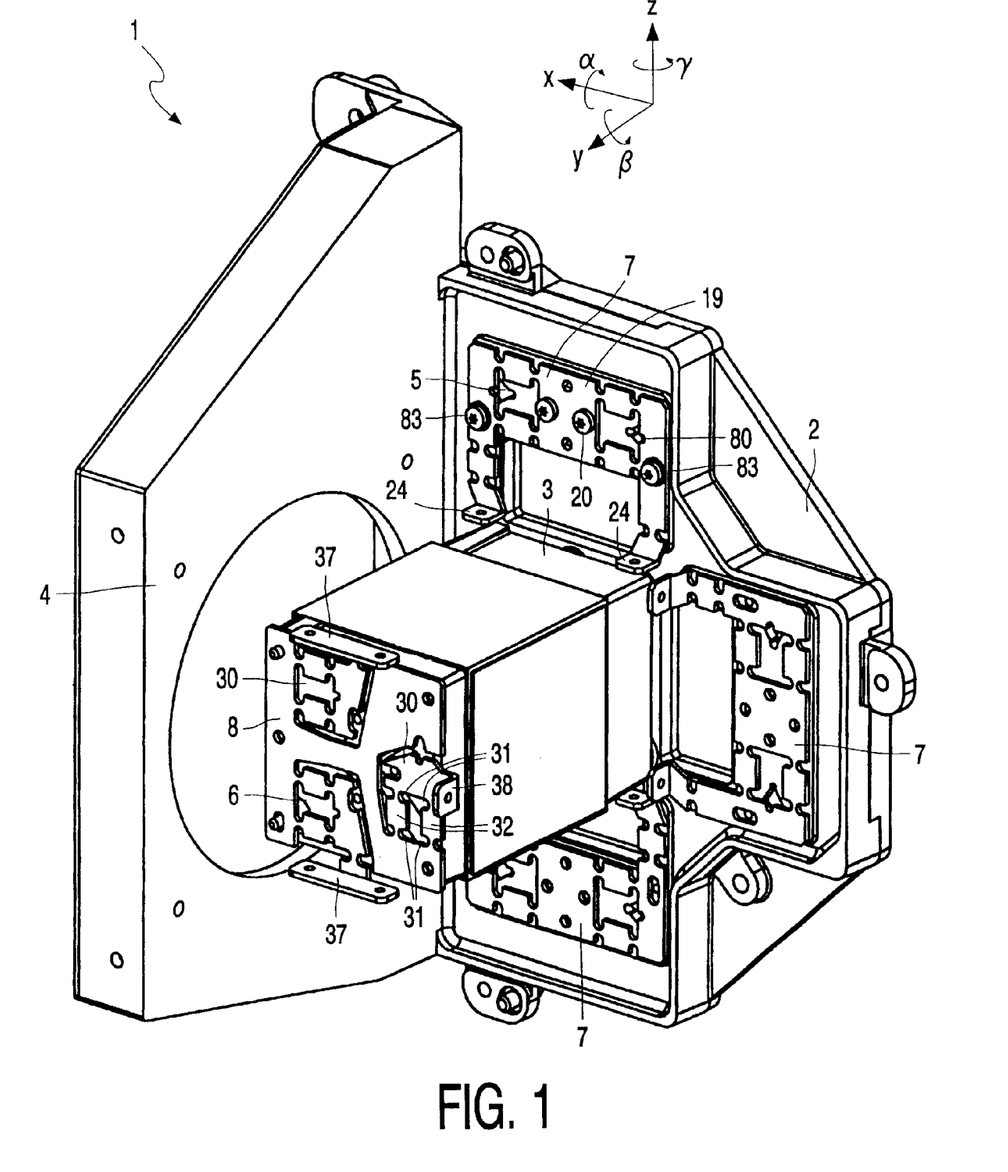
FIG. 1 is a perspective elevational view of an image display device according to the invention during assembly.
Figure 2:
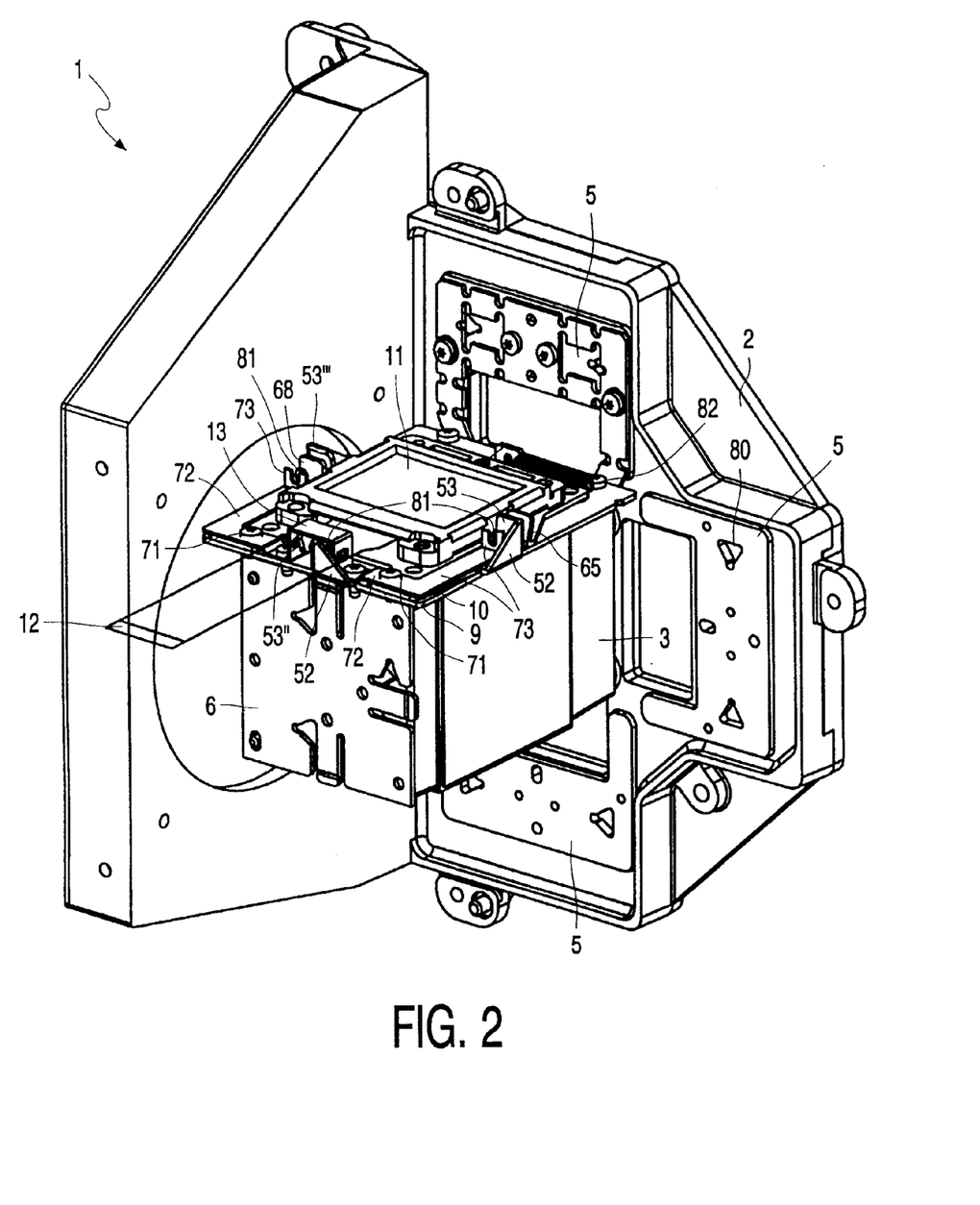
FIG. 2 is a perspective elevational view of another step during assembly of the image display device shown in FIG. 1.

FIGS. 1 and 2 are perspective elevational views of an image display device 1 according to the invention, in which different components have been omitted in both elevational views so as to clarify the structure and operation of the image display device 1. The structure of the entire image display device 1 will, however, become clear from the following description.

FIG. 1 shows a system of axes comprising three axes X, Y, Z extending transversely to each other and three directions of rotation α, β, γ extending transversely to each other.

The image display device 1 comprises a frame 2, a cube-shaped prism 3 connected to the frame 2 and a lens holder 4 arranged opposite a side of the prism 3. The image display device 1 further comprises a light source, a separating means for splitting a light beam from the light source into light beams having at least three different colors, and guide means for guiding each light beam towards the prism 3. The image display device 1 is further provided with projection means on a side of the lens holder 4 remote from the prism 3. The light source, the separating means and the guide means are known per se, for example, from the above-mentioned U.S. Pat. No. 5,868,485 and will therefore not be elucidated.

The frame 2 has three base plates 5 (FIG. 2) located opposite three sides of the prism 3. Proximate to the lower side of the prism 3, each base plate 5 extends in a plane of the prism 3 extending transversely to the proximate plane. On an upper side remote from the lower side, the prism 3 is provided with a connection plate 6. The connection plate 6 extends parallel to the two base plates 5.

Figure 3:
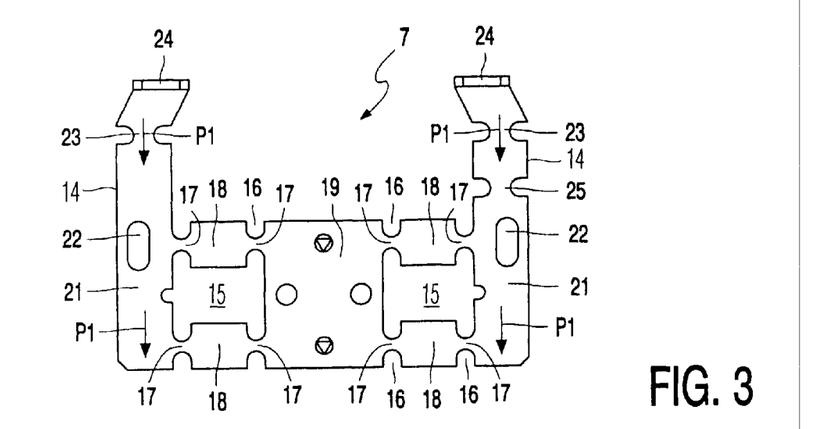
FIG. 3 shows a first plate of the image display devices shown in FIGS. 1 and 2.

A first plate 7, which will be further described with reference to FIG. 3, is connected to each base plate 5.

Figure 5:
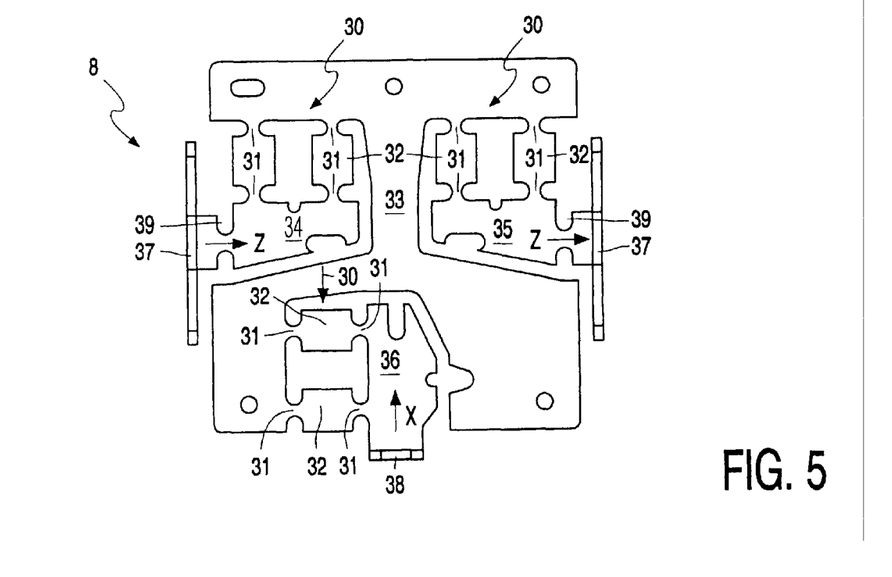
FIG. 5 shows a second plate of the image display device shown in FIGS. 1 and 2, FIGS. 6A–6C are a perspective elevational view, a side elevation and a plan view, respectively, of a bearing plate of the image display device shown in FIGS. 1 and 2, FIGS. 7A–7C are a perspective elevational view, a side elevation and a plan view, respectively, of a supporting plate of the image display device shown in FIGS. 1 and 2.

A second plate 8, which will be further described with reference to FIG. 5, is connected to the connection plate 6.

A bearing plate 9, which will be further described with reference to FIGS. 6A–6C, extends between each first plate 7 and second plate 8.

Figure 7A:
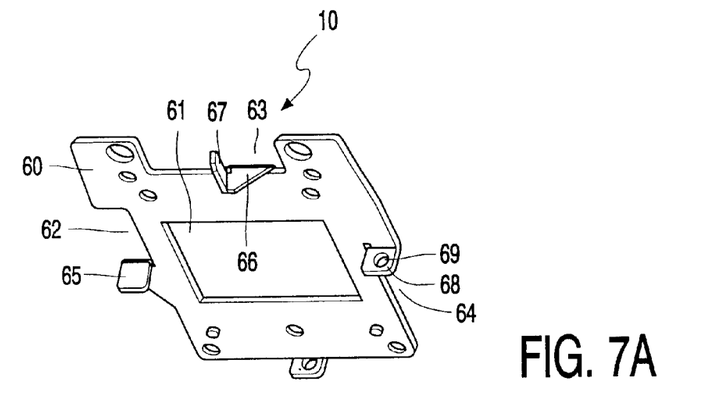
Figure 7B:
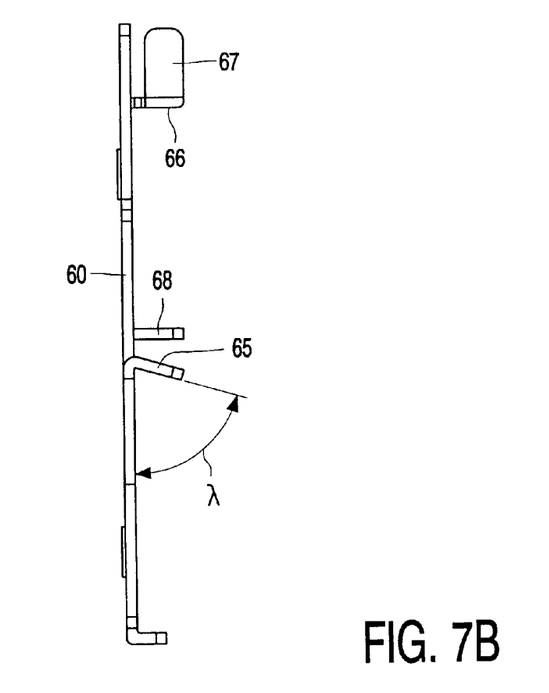
Figure 7C:
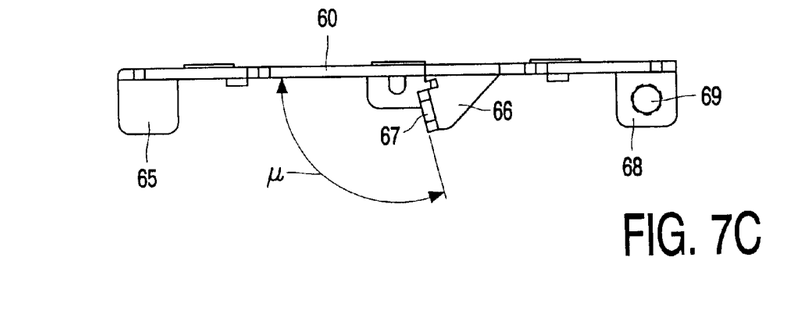

Two bearing plates 9 extend parallel to each other while a third bearing plate 9 extends transversely to the other two bearing plates 9. On sides which are remote from each other, supporting plates 10, which will be further described with reference to FIGS. 7A–7C, are arranged opposite the two parallel extending bearing plates 9. Each of the three supporting plates 10 is provided with a light modulation panel 11 which is connected to a ribbon cable 12 for driving the light modulation panel 11. The bearing plate 9 extending transversely to the supporting plates 10 is directly connected to a light modulation panel 11. For the sake of clarity of the drawings, this is not shown.

The bearing plate 9 and the supporting plate 10 are fixed with respect to each other by means of a fixation bracket 13 which will be further described with reference to FIG. 8.

Before elucidating the adjustment of the light modulation panels 11 with respect to the prism 3, the separate components will be first described in greater detail.

FIG. 3 shows a first plate 7 which is provided with two parallelogram mechanisms 14. Each parallelogram mechanism 14 is constituted by a H-shaped recess 15 in the first plate 7 and four recesses 16 situated opposite the legs of the H-shaped recess 15. In this way, plate or leaf hinges 17 are formed between the legs of the H-shaped recess 15 and the recesses 16. Bridging parts 18 extend between two pairs of leaf hinges 17. On a side remote from the bridging parts 18, a pair of leaf hinges 17 is connected to a core part 19 which is rigidly connected to the base plate 5 by means of screws 20 (see FIG. 1). Another pair of leaf hinges 17 is connected to a coupling part 21 on a side remote from the bridging parts 18. Each coupling part 21 has an elongated groove 22 and a fixation element 24 connected to the coupling part 21 via a leaf hinge 23. To enhance the movability, the coupling part 21 shown on the right-hand side in FIG. 3 is provided with a further leaf hinge 25 which is situated between the leaf hinge 23 and the groove 22.

The coupling part 21 connected to the parallelogram mechanism 14 is movable by means of each parallelogram mechanism 14 with respect to the core part 19 into and opposite the direction indicated by the arrow P1. Simultaneously with the displacement into or opposite the direction indicated by the arrow P1, there is a small displacement of the coupling part 21 in a direction towards or away from the core part 19. The fixation elements 24 are spaced apart at a fixed distance and cannot be moved towards each other. When displacing a coupling part 21 into a direction towards or away from the core part 19, the fixation element 24 thus tilts about the leaf hinge 23 with respect to the coupling part 21.

FIG. 5 shows a second plate 8 having three parallelogram mechanisms 30 which, likewise as the parallelogram mechanism 14, have four leaf hinges 31 and bridging parts 32 situated between two pairs of leaf hinges 31. Each parallelogram mechanism 30 is connected on one side to a central core part 33 via a pair of leaf hinges 31. Each parallelogram mechanism 30 is connected to a coupling part 34, 35, 36 on a side remote from the core part 33 via another pair of leaf hinges 31. The coupling parts 34, 35 are in a mirror-symmetrical position with respect to each other and provided with an elongated fixation element 37 on their sides facing away from each other. The coupling element 36 is provided with a fixation element 38 on a side remote from the parallelogram mechanism 30.

Each fixation element 37 is connected to the associated coupling part 34, 35 via a leaf hinge 39. Since the fixation element 38 is connected to the bearing plate 9 at one point only, such a leaf hinge is not required for the coupling part 36.

The fixation elements 37 are movable into and opposite the Z direction by means of the associated parallelogram mechanism 30. The fixation element 38 is movable in the X direction by means of the associated parallelogram mechanism 30.

Figure 4:
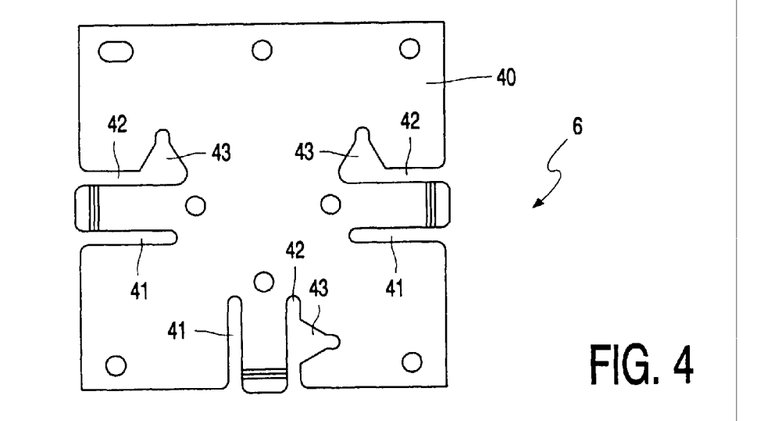
FIG. 4 shows an auxiliary plate of the image display device shown in FIGS. 1 and 2.

FIG. 4 shows the connection plate 6 which has a core part 40 and grooves 41, 42 provided in the core part 40 and extending transversely to the edges. Each groove 42 terminates in a triangular recess 43 on a side remote from the edges. Lugs supporting and displacing, partly jointly with the coupling parts 34, 35, 36, the superjacent coupling parts 34, 35, 36 are situated between the grooves 41, 42.

Figure 6A:
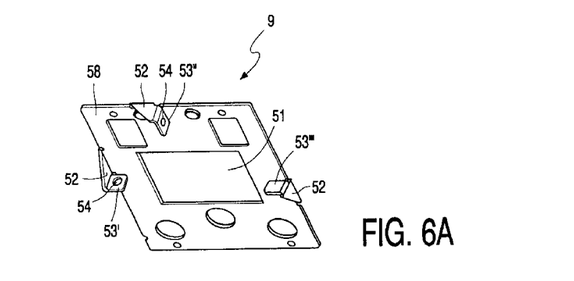
Figure 6B:
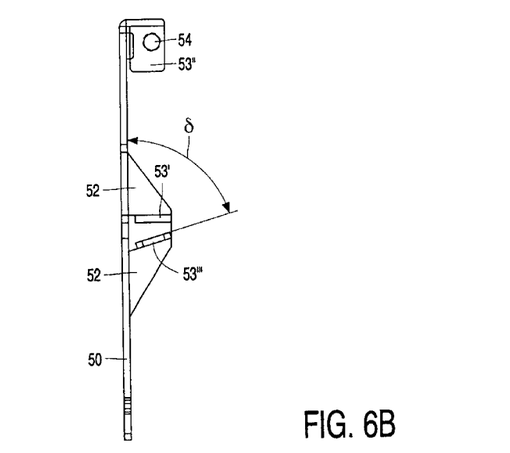
Figure 6C:
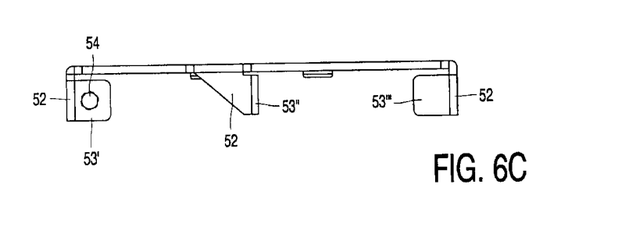

FIGS. 6A–6C show a bearing plate 9 which has a core part 50 with a central recess 51 through which light from the light modulation panel 11 travels towards the prism 3. The bearing plate 9 shown in FIGS. 6A–6C is the bearing plate situated on the right-hand side in the image display device 1 shown in FIGS. 1 and 2. The other bearing plates 9 are formed in a similar manner.

The bearing plate 9 has three triangular bridging parts 52 extending transversely to the core part 50, and three lugs 53 bent from the bridging parts 52. The lugs 53', 53" situated near the upper left-hand corner in FIG. 6A are provided with a threaded aperture 54. The lugs 53 extend transversely to the core part 50. The lug 53''' situated proximate to the right-hand side in FIG. 6A encloses an angle δ with the core part 50 in the manner shown in FIG. 6B. As is clearly visible in FIG. 6B, the angle δ extends between a side of lug 53''' remote from the bridging part 52.

FIGS. 7A–7C show the supporting plate 10 associated with the bearing plate 9 shown in FIGS. 6A–6C. The supporting plate 10 has a core part 60. The core part 60 has a recess 61 through which light from the light modulation panel 11 travels towards the prism 3. The core part 60 is further provided with three recesses 62, 63, 64 situated along the circumference so as to pass through the lugs 53 of the bearing plate 9. On the left-hand side in FIG. 7A, the core part 60 has a lug 65 which encloses an angle λ with the core part 60. Proximate to the upper side (FIG. 7A), the core part 60 is provided with a triangular bridging part 66 and a lug 67 connected thereto. As can be seen in FIG. 7C, the lug 67 encloses a butt angle μ with the core part 60.

The core part 60 is further provided on the left-hand side (FIG. 7A) with a lug 68 extending transversely to the core part 60 and having a threaded aperture 69.

Figure 8:
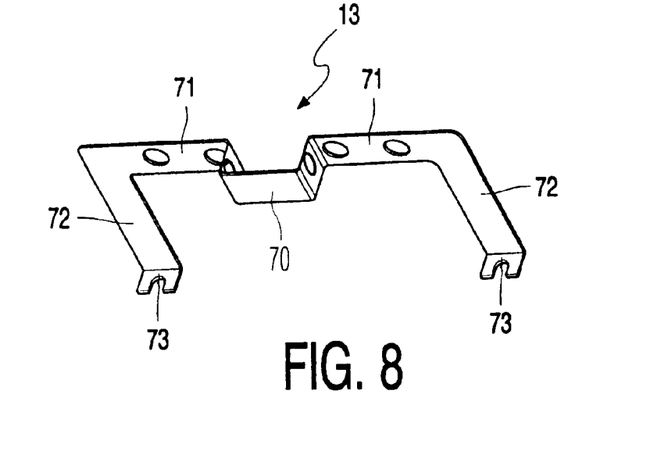
FIG. 8 shows a fixation bracket of the image display device shown in FIGS. 1 and 2.

FIG. 8 shows the fixation bracket 13 which has a U-shaped core part 70 and legs 71 extending on both sides of the U-shaped core part 70. On a side remote from the U-shaped core part 70, each leg 71 is provided with a leg 72 extending transversely to the leg 71. On a side remote from the leg 71, the leg 72 is provided with a U-shaped lug 73 extending transversely to the leg 72.

As indicated above, the operation of adjusting the light modulation panel 11 with respect to the prism 3 will be elucidated with reference to the bearing plate 9 situated on the right-hand side in FIGS. 1 and 2 and the supporting plate 10 connected thereto.

As is shown in FIGS. 1 and 2, the first plate 7 is connected to the base plate 5 by means of screws 20 extending through the core part 19. The first plate 7 is also connected to the lower side (FIG. 6A) of the bearing plate 9 by means of the two fixation elements 24.

The second plate 8 is connected to the connection plate 6 situated on the prism 3. The second plate 8 is connected to the upper side (FIG. 6A) of the bearing plate 9 by means of the fixation element 37. The fixation bracket 13 is fixed to the bearing plate 9.

Before describing the connection of the supporting plate 10 with the bearing plate 9, the adjustment of the bearing plate 9 with respect to the prism 3 will be elucidated first.

To adjust the bearing plate 9 with respect to the prism 3, use is made of the two parallelogram mechanisms 14 of the first plate 7 and one of the parallelogram mechanisms 30 of the second plate 8. An adjusting mechanism, for example, a screwdriver is inserted through the H-shaped opening of the parallelogram mechanism 14, 30 into a subjacent recess 80, 43 in the base plate 5 or the connection plate 6, respectively. By subsequently turning the screwdriver, the associated coupling parts 21 and 35 and the fixation elements 24 and 37, respectively, connected thereto are moved parallel to the Z direction.

If all of the three fixation elements 24, 37 are moved through the same distance in the Z direction, the bearing plate 9 connected thereto is also moved in the same direction. If each fixation element 24 is moved through an equal distance in the Z direction while the fixation element 37 is moved in the opposite direction, a tilt α of the bearing plate 9 takes place. If the fixation element 37 is not moved whereas the fixation elements 24 are moved in opposite directions, a tilt β of the bearing plate 9 takes place. During this tilt β, the fixation elements 24, 37 swivel about the respective leaf hinges 23, 39. In this way, the bearing plate 9, the supporting plate 10 connected thereto and the light modulation panel 11 connected thereto are positionable in a plane extending parallel to the side of the prism 3.

Figure 9:
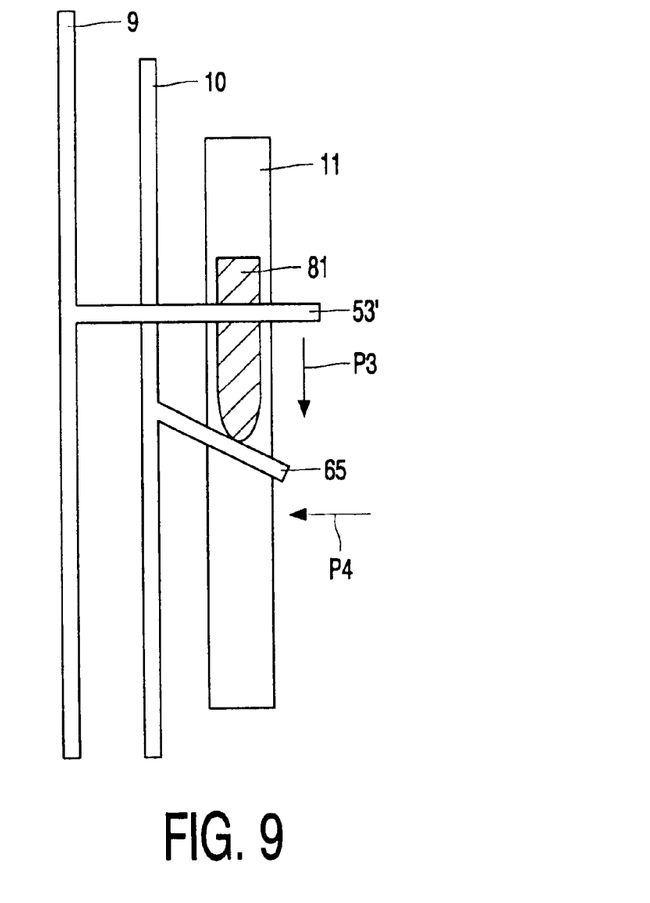
FIG. 9 is a diagrammatic side elevation of the adjustment of the supporting plate with respect to the bearing plate.
Figure 10:
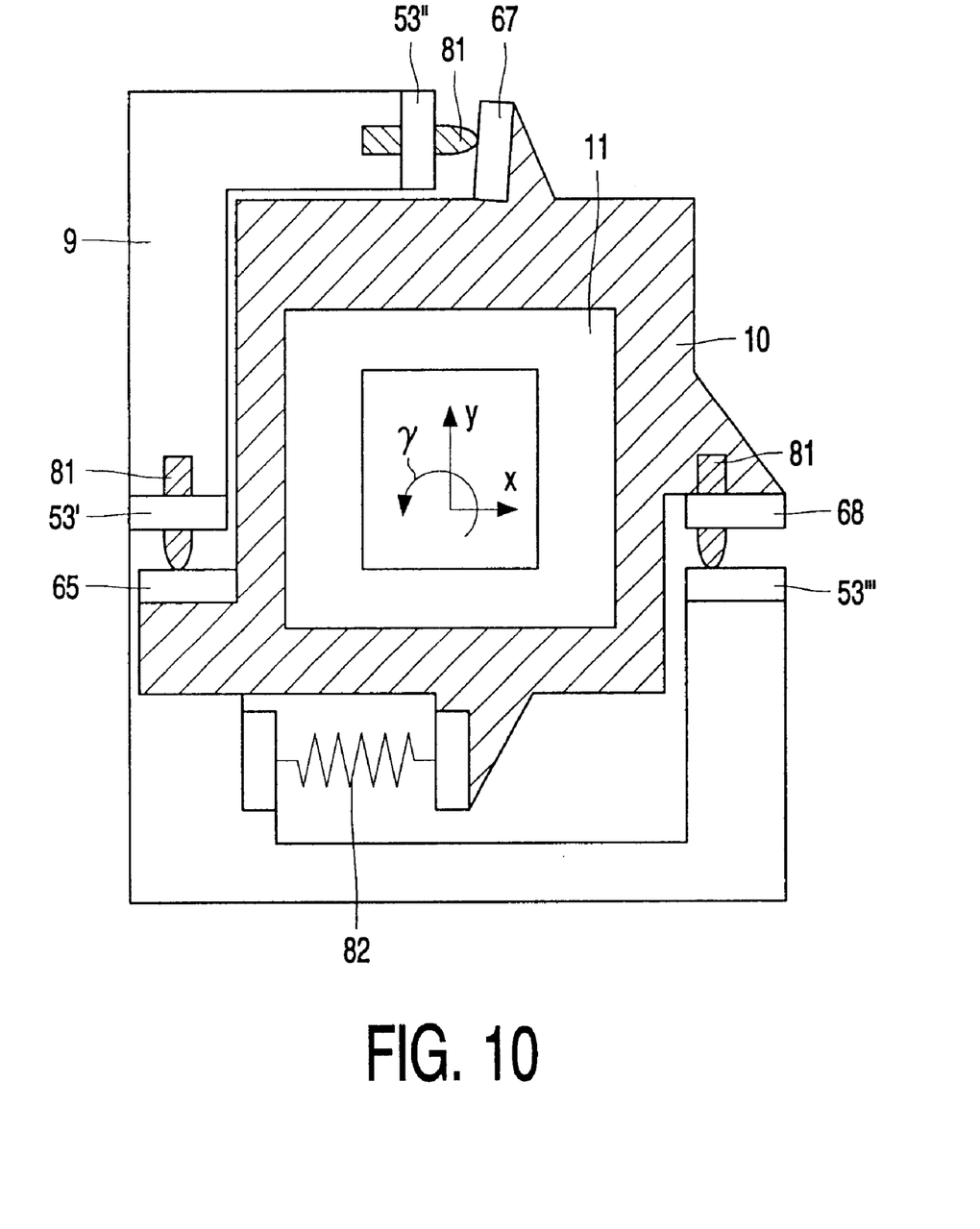
FIG. 10 is a diagrammatic front elevation of the adjustment of the supporting plate with respect to the bearing plate.

The supporting plate 10 with the light modulation panel 11 connected thereto is positioned with respect to the bearing plate 9 in the manner shown in FIG. 2. In this case, the left lug 53' is situated above the lug 65, the right lug 53''' is situated below the lug 68 and the upper lug 53" is situated to the left of the lug 67. Proximate to its upper side, the supporting plate 10 is situated between the bearing plate 9 and the fixation bracket 13. Adjusting nuts 81, one end of which abuts on the opposite lugs, extend through the threaded lugs. Proximate to the lower side, a tensile spring 82 extends between the supporting plate 10 and the bearing plate 9, with the aid of which spring the nuts 81 resiliently abut on the facing lugs. FIGS. 9 and 10 show on a diagrammatically enlarged scale the location of the lugs and the position of the associated nuts 81.

When the nuts 81 located on the left and right-hand sides are simultaneously turned, the supporting plate 10 is displaced with respect to the bearing plate 9 in the Y direction. When only the upper nut 81 is turned, the supporting plate 10 is displaced with respect to the bearing plate 9 in the X direction. When the left and right nuts 81 are turned in opposite directions, a tilt γ of the supporting plate 10 with respect to the bearing plate 9 will take place.

Since the lugs 53, 65 and 67 enclose an angle δ, γ and μ, respectively, with the X-Y plane, the slanting lug 65 and thus the supporting plate 10 connected thereto will be displaced towards the bearing plate 9 in the direction indicated by arrow P4, by moving the nut 81 in the direction indicated by the arrow P3, as is visible in FIG. 9.

In this way, the supporting plate 10 is rigidly pressed against the bearing plate 9. The light modulation panel 11 connected to the supporting plate 10 can be oriented by means of the three nuts 81 in the plane defined by means of the bearing plate 9.

After the light modulation panel 11 has been positioned in the X, Y, Z direction in the manner described above and has undergone a rotation α, β, γ, so that the desired position of the light modulation panel 11 with respect to the prism 3 is obtained, the coupling parts 21 of the first plate 7 are connected to the base plate 5 by means of nuts 83 (see FIG. 1). Similarly, the second plate 8 is connected to the connection plate 6.

The supporting plate 10 is fixed with respect to the bearing plate 9 by means of the fixation bracket 13, while nuts extend through the fixation bracket 13, the supporting plate 10 and the bearing plate 9. When the nuts are being tightened, the fixation bracket 13 prevents an unwanted of the supporting plate 10 with respect to the bearing plate 9.

It is possible to form the frame 2, the lens holder 4 and the base plate 5 as a single component.

What is claimed is:

1. An image display device comprising a light source, a separating means for splitting a light beam from the light source into light beams having at least three different colors, at least three light modulation panels, guide means for guiding each light beam towards an associated light modulation panel, combination means for combining the light beams modulated by the light modulation panels, and at least one adjusting mechanism for adjusting at least one light modulation panel with respect to the combination means, characterized in that the adjusting mechanism is provided with two plates extending transversely to the light modulation panel, the first plate having at least two points of fixation, each of which is movable in the plane of the plate by means of a parallelogram mechanism, and the second plate having at least one point of fixation which is movable in the plane of the second plate by means of a parallelogram mechanism, each parallelogram mechanism being provided with an associated locking mechanism, the adjusting mechanism being further provided with a bearing plate connected to the points of fixation and supporting the light modulation panel, which bearing plate is movable by means of the two parallelogram mechanisms in a direction extending transversely to the bearing plate and is tiltable about axes extending in the plane of the bearing plate.

2. An image display device as claimed in claim 1, characterized in that each parallelogram mechanism is formed by four leaf hinges in the plate.

3. An image display device comprising a light source, a separating means for splitting a light beam from the light source into light beams having at least three different colors, at least three light modulation panels, guide means for guiding each light beam towards an associated light modulation panel, combination means for combining the light beams modulated by the light modulation panels, and at least one adjusting mechanism for adjusting at least one light modulation panel with respect to the combination means, characterized in that the adjusting mechanism is provided with two plates extending transversely to the light modulation panel, the first plate having at least two points of fixation, each of which is movable in the plane of the plate by means of a parallelogram mechanism, and the second plate having at least one point of fixation which is movable in the plane of the second plate by means of a parallelogram mechanism, each parallelogram mechanism being provided with an associated locking mechanism, the adjusting mechanism being further provided with a bearing plate connected to the points of fixation and supporting the light modulation panel, which bearing plate is movable by means of the two parallelogram mechanisms in a direction extending transversely to the bearing plate and is tiltable about axes extending in the plane of the bearing plate, characterized in that the adjusting mechanism is provided with a supporting plate which extends parallel to the bearing plate and to which the light modulation panel is connected, said supporting plate being movable with respect to the bearing plate in directions extending parallel to the bearing plate, and being tiltable about an axis extending transversely to the bearing plate.

4. An image display device as claimed in claim 3, characterized in that the bearing plate and the supporting plate are provided with pairs of lugs extending from the bearing plate, at least a first lug of each pair of lugs being provided with an adjusting screw one end of which abuts on the second lug.

5. An image display device as claimed in claim 4, characterized in that the adjusting screw resiliently abuts on the second lug.

6. An image display device as claimed in claim 5, characterized in that the first lug connected to the bearing plate extends transversely to the bearing plate, while the second lug connected to the supporting plate is situated on a side remote from the bearing plate and extends at an angle in a direction away from the first lug.

7. An image display device as claimed in claim 5, characterized in that the first lug connected to the supporting plate extends transversely to the supporting plate, while the second lug connected to the bearing plate is situated on a side facing the supporting plate and extends at an angle in a direction towards the first lug.

8. An image display as claimed in claim 4, characterized in that the first lug connected to the bearing plate extends transversely to the bearing plate, while the second lug connected to the supporting plate is situated on a side remote from the bearing plate and extends at an angle in a direction away from the first lug.

9. An image display device as claimed in claim 4, characterized in that the first lug connected to the supporting plate extends transversely to the supporting plate, while the second lug connected to the bearing plate is situated on a side facing the supporting plate and extends at an angle in a direction towards the first lug.

10. An image display device comprising a light source, a separating means for splitting a light beam from the light source into light beams having at least three different colors, at least three light modulation panels, guide means for guiding each light beam towards an associated light modulation panel, combination means for combining the light beams modulated by the light modulation panels, and at least one adjusting mechanism for adjusting at least one light modulation panel with respect to the combination means, characterized in that the adjusting mechanism is provided with two plates extending transversely to the light modulation panel, the first plate having at least two points of fixation, each of which is movable in the plane of the plate by means of a parallelogram mechanism, and the second plate having at least one point of fixation which is movable in the plane of the second plate by means of a parallelogram mechanism, each parallelogram mechanism being provided with an associated locking mechanism, the adjusting mechanism being further provided with a bearing plate connected to the points of fixation and supporting the light modulation panel, which bearing plate is movable by means of the two parallelogram mechanisms in a direction extending transversely to the bearing plate and is tiltable about axes extending in the plane of the bearing plate, characterized in that each parallelogram mechanism is formed by four leaf hinges in the plate, further characterized in that the adjusting mechanism is provided with a supporting plate which extends parallel to the bearing plate and to which the light modulation panel is connected, said supporting plate being movable with respect to the bearing plate in directions extending parallel to the bearing plate, and being tiltable about an axis extending transversely to the bearing plate.

11. An image display device as claimed in claim 10, characterized in that the bearing plate and the supporting plate are provided with pairs of lugs extending from the bearing plate, at least a first lug of each pair of lugs being provided with an adjusting screw one end of which abuts on the second lug.

12. An image display device as claimed in claim 11, characterized in that the adjusting screw resiliently abuts on the second lug.

13. An image display device as claimed in claim 12, characterized in that the first lug connected to the bearing plate extends transversely to the bearing plate, while the second lug connected to the supporting plate is situated on a side remote from the bearing plate and extends at an angle in a direction away from the first lug.

14. An image display device as claimed in claim 11, characterized in that the first lug connected to the bearing plate extends transversely to the bearing plate, while the second lug connected to the supporting plate is situated on a side remote from the bearing plate and extends at an angle in a direction away from the first lug.

15. An image display device as claimed in claim 11, characterized in that the first lug connected to the supporting plate extends transversely to the supporting plate, while the second lug connected to the bearing plate is situated on a side facing the supporting plate and extends at an angle in a direction towards the first lug.

16. An image display device as claimed in any one of the preceding claims, characterized in that the adjusting mechanism is provided with a fixation mechanism so as to fix the supporting plate to the bearing plate.

17. An image display device as claimed in any of claims 1–9 and 10–15, characterized in that the combination means comprise a prism, in which one plate is connected to one side of the prism, the bearing plate is situated parallel to a further side extending transversely to the side and the second plate is connected to a frame supporting the prism.

* * * * *